United States Patent [19]

Lee

[11] Patent Number: 5,350,432

[45] Date of Patent: Sep. 27, 1994

[54] DIRT FILTERING AND COLLECTING APPARATUS FOR VACUUM CLEANER

[75] Inventor: Jae I. Lee, Seoul, Rep. of Korea

[73] Assignee: Goldstar Co., Ltd., Rep. of Korea

[21] Appl. No.: 52,188

[22] Filed: Apr. 22, 1993

[30] Foreign Application Priority Data

Apr. 23, 1992 [KR] Rep. of Korea ............... 6745/1992

[51] Int. Cl.⁵ ............................................. B01D 45/14
[52] U.S. Cl. ........................................ 55/408; 55/406; 55/DIG. 3
[58] Field of Search ................. 55/DIG. 3, 395, 399, 55/394, 396, 404, 406, 407, 408

[56] References Cited

U.S. PATENT DOCUMENTS

| | | | |
|---|---|---|---|
| 1,411,606 | 4/1922 | Brereton | 55/395 |
| 1,420,665 | 6/1922 | Newcombe | 55/DIG. 3 |
| 1,665,434 | 4/1928 | Bennett | 55/395 |
| 1,785,918 | 12/1930 | Stebbins | 55/406 |
| 2,195,707 | 4/1940 | Nutting | 55/407 |
| 2,289,474 | 7/1942 | Anderson | 55/406 |
| 2,594,805 | 4/1952 | Rammel | 55/395 |
| 2,804,163 | 8/1957 | Bullock et al. | 55/408 |
| 2,849,080 | 8/1958 | Enright | 55/DIG. 3 |
| 2,932,360 | 4/1960 | Hungate | 55/404 |
| 2,975,861 | 3/1961 | Hayes, Jr. | 55/404 |
| 3,360,909 | 1/1968 | Barmerias | 55/395 |
| 3,426,513 | 2/1969 | Bauer | 55/395 |
| 3,802,162 | 4/1974 | Deane | 55/406 |
| 4,840,645 | 6/1989 | Woodworth et al. | 55/406 |

Primary Examiner—Tim Miles
Attorney, Agent, or Firm—Ostrolenk, Faber, Gerb & Soffen

[57] ABSTRACT

A dirt collecting apparatus for a vacuum cleaner which is adapted to decrease a volume of a canister body thereby facilitating a handling of the vacuum cleaner and which has a dirt container that is easily detached from the apparatus. The apparatus comprises a dirt collecting chamber connected between a wand and a handle pipe, a cyclone part inserted in the dirt collecting chamber which converts a linear flow in the dirt collecting chamber into a cyctonical flow, and a dirt container mounted on the outer surface of the dirt collecting chamber which receives the dirt separated in the dirt collecting chamber.

3 Claims, 3 Drawing Sheets

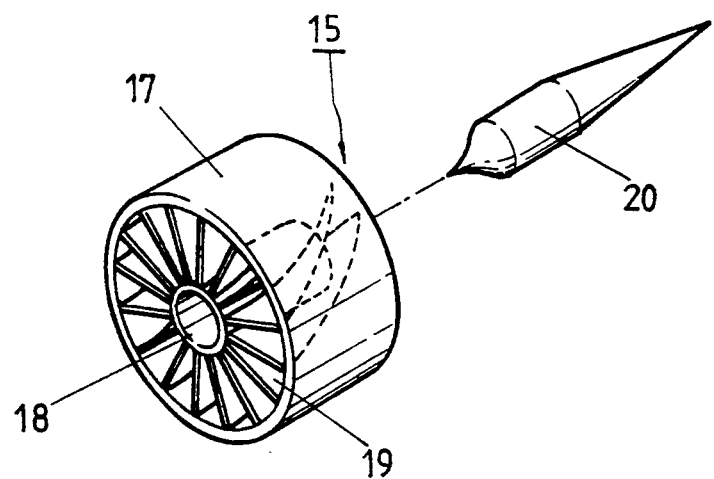
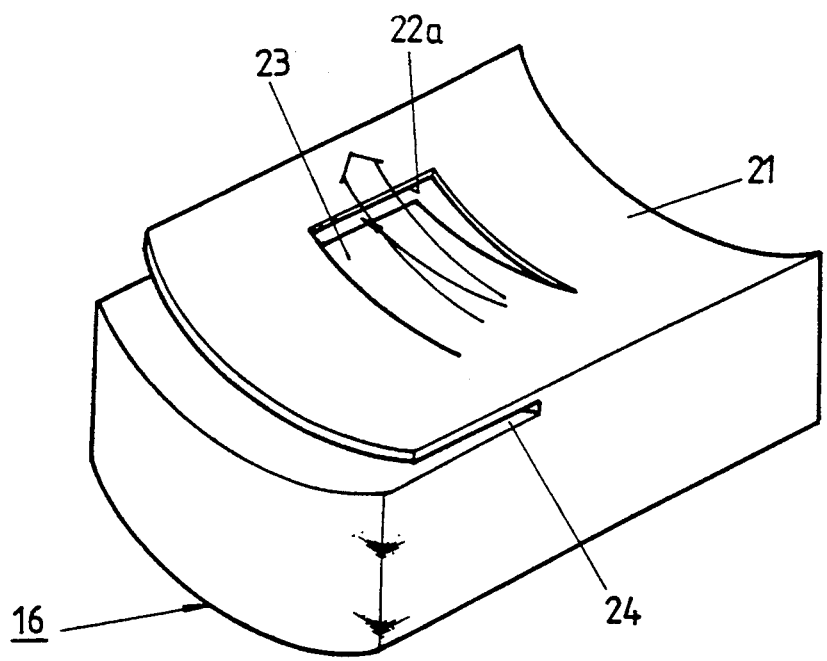

DIRT FILTERING AND COLLECTING APPARATUS FOR VACUUM CLEANER

BACKGROUND OF THE INVENTION

1. Field of the Invention

The present invention is related to a dirt filtering and collecting apparatus for vacuum cleaner, and more particularly to a wand-shaped dirt filtering and collecting apparatus for vacuum cleaner which is mounted between a wand connected to a nozzle and a handle pipe connected to a canister body of a vacuum cleaner and which has a detachable dirt container utilizing a centrifugal force, whereby a volume of the canister is considerably reduced and also the collected dirt is easily eliminated from the vacuum cleaner.

2. Description of the Prior Art

In one type of vacuum cleaner as illustrated in FIG. 1, a canister body 40' is provided at its bottom surface with wheels 30' to be moved freely and at its interior space with a dirt filtering and collecting apparatus 16' having a dirt filtering net. The canister body 40' is also provided with an electric motor 28' next to the dirt collecting apparatus 16' and a fan 29' fixedly mounted on a shaft of the electric motor 28'.

A flexible hose 31' is connected to the canister body 40' by a suitable connector at its one end and connected to a rear end of a handle pipe 13' at its other end. The handle pipe 13' is connected at its front end to a wand comprising a plurality of wand segments 11' and the front wand segments 11' of the wand is connected to a nozzle 27'. That is, since the dirt collecting apparatus 16' is removably mounted in the canister body 40', the dirt collecting apparatus 16' can be separated from and pulled out of the canister body 40' when it is necessary to discard the dirt collected in the dirt collecting apparatus 16'.

In use of the above-mentioned prior vacuum cleaner, upon driving the electric motor 28' received in the canister body 40', the fan 29' fixed to the shaft of the electric motor 28' is rotated. Due to the rotation of the fan 29', air in the canister body 40' is discharged outward from the canister body 40' while a suction force is generated at the nozzle 27' via the hose 31', the handle pipe 13' and the wand segments 11 thereby causing dirt-laden air to be introduced into the nozzle 27'. The dirt-laden air sucked in the nozzle 27' arrives at the dirt collecting apparatus 16' through the wand segments 11', the handle pipe 13' and the flexible hose 31'. Then, the dirt in the dirt-laden air is filtered at the dirt filtering and collecting apparatus 16' while the filtered air is passed through the dirt collecting apparatus 16' and discharged outwardly. Thereafter, when the dirt collecting apparatus 16' is fully filled with the dirt, the dirt collecting apparatus 16' is removed from the canister body 40' to discard the collected dirt.

However, since the above-mentioned prior vacuum cleaner has the dirt collecting apparatus containing the filtering net which is received in the canister body together with the electric motor and the fan, the canister body becomes larger in volume, thereby causing a handling of the vacuum cleaner to be troublesome. In addition, since the dirt collecting apparatus should be separated from the canister body when the collected dirt is necessary to be discarded, the prior vacuum cleaner causes also the separation and the installation of the dirt collecting apparatus to be troublesome.

SUMMARY OF THE INVENTION

Accordingly, it is an object of the present invention to provide a dirt filtering and collecting apparatus for a vacuum cleaner which is mounted between a wand and a handle pipe and has a detachable dirt container so that a canister body is decreased in volume and the dirt container is easily separated from the vacuum cleaner to discard the dirt collected in the container.

In accordance with the present invention, the object mentioned above can be accomplished by providing a dirt collecting apparatus for a vacuum cleaner in which a cyclone dirt collecting chamber containing a cyclone part for separating and collecting dirt from dirt-laden air is connected between a wand and a handle pipe and a dirt container is detachably mounted on a lower surface of the dirt collecting chamber in order to receive the dirt separated from the dirt collecting chamber.

In operation of the above-described dirt collecting apparatus, dirt-laden air is introduced into the dirt collecting chamber through a nozzle and the wand where dirt-laden air is separated into dirt and pure air. Then, the pure air is introduced into a canister body through a hose and discharged outwardly from the canister body while the separated pure dirt is spirally advanced along the inner surface of dirt collecting chamber due to a centrifugal force and received in the dirt container. The dirt container may be easily separated from the dirt collecting chamber in order to eliminate the collected dirt when required.

BRIEF DESCRIPTION OF THE DRAWINGS

These and other objects, features and advantages of the invention will become more apparent upon a reading of the following detailed specification and drawings, in which:

FIG. 4 is a perspective view of a cyclone part of FIG. 3; and

FIG. 5 is a perspective view of a dirt container of the invention.

DETAILED DESCRIPTION OF THE PREFERRED EMBODIMENTS

A dirt filtering and collecting apparatus for vacuum cleaner according to the present invention will now be described by referring to accompanying drawings.

Figure 1:
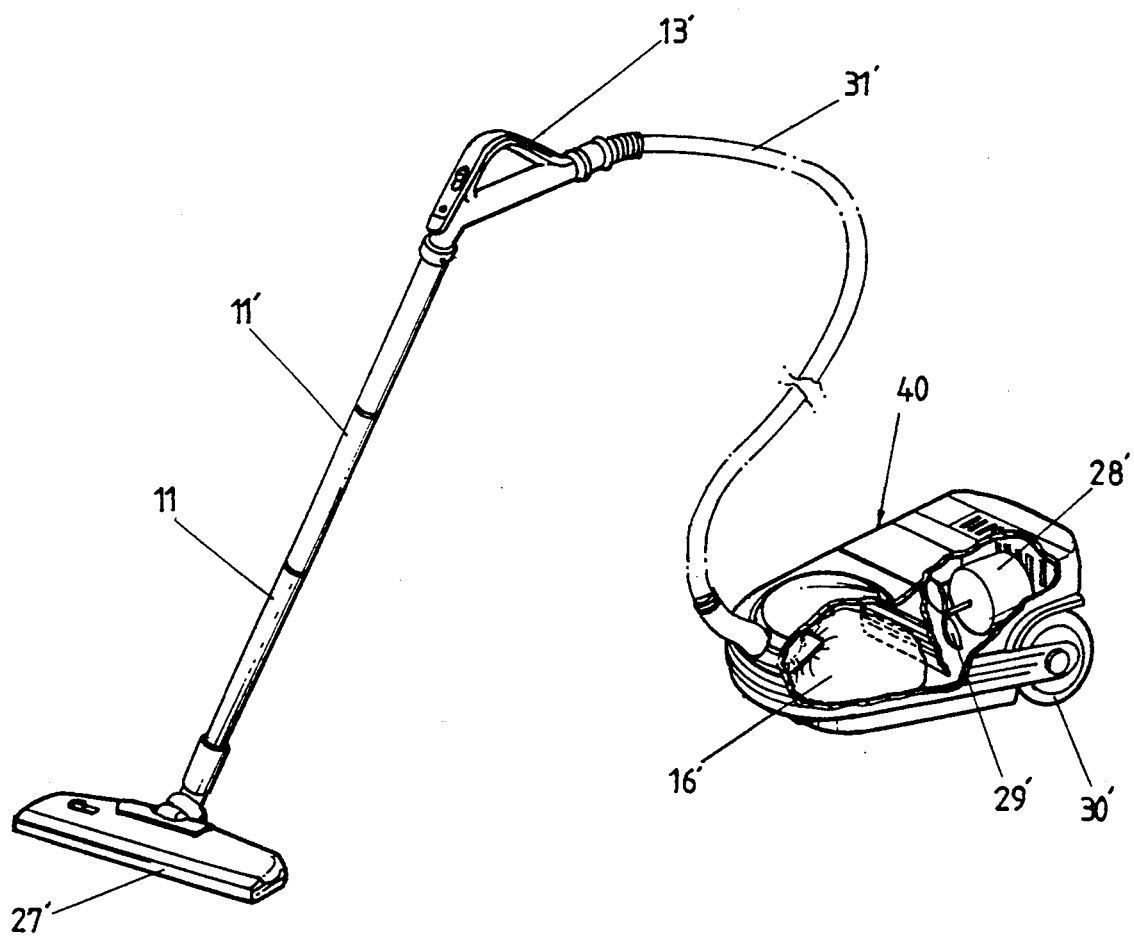
FIG. 1 is a schematic perspective view of a conventional vacuum cleaner.
Figure 2:
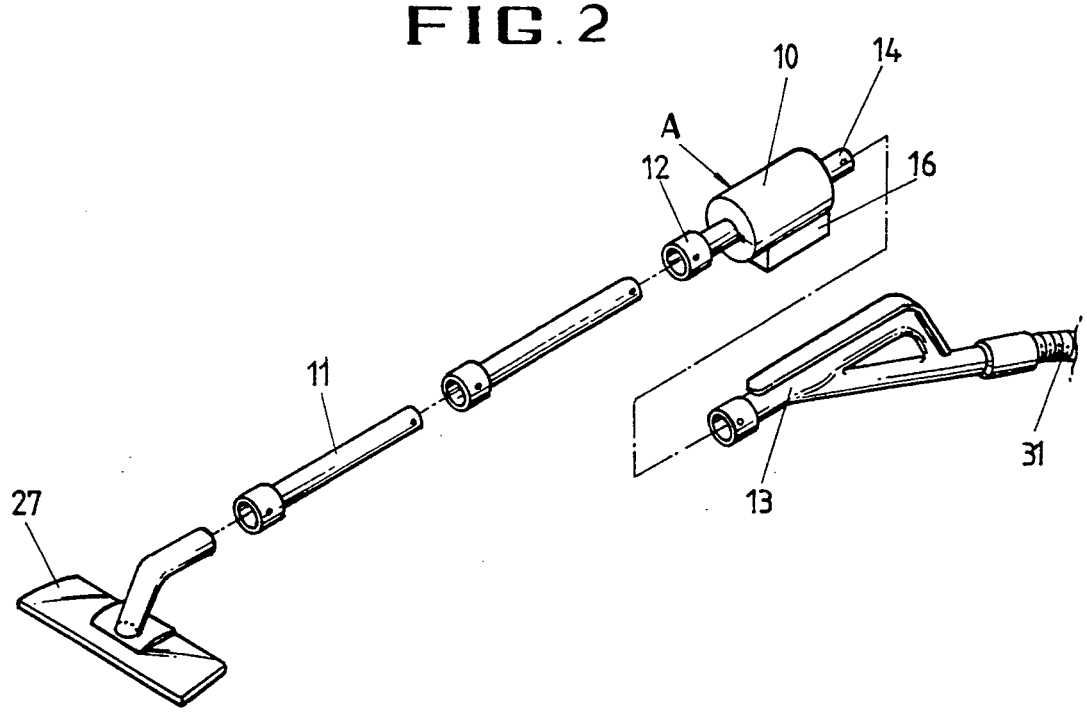
FIG. 2 is an exploded perspective view of a dirt collecting apparatus according to the present invention and the associated components.

Referring to FIG. 2, there is shown a dirt filtering and collecting apparatus for a vacuum cleaner of the invention which is to be connected to the associated components. The dirt collecting apparatus "A" is interconnected between a wand connected to a nozzle 27 and a handle pipe 13 connected to a canister body (not shown) through a flexible hose 31. The wand 11 may be divided into a plurality of wand segments.

Figure 3:
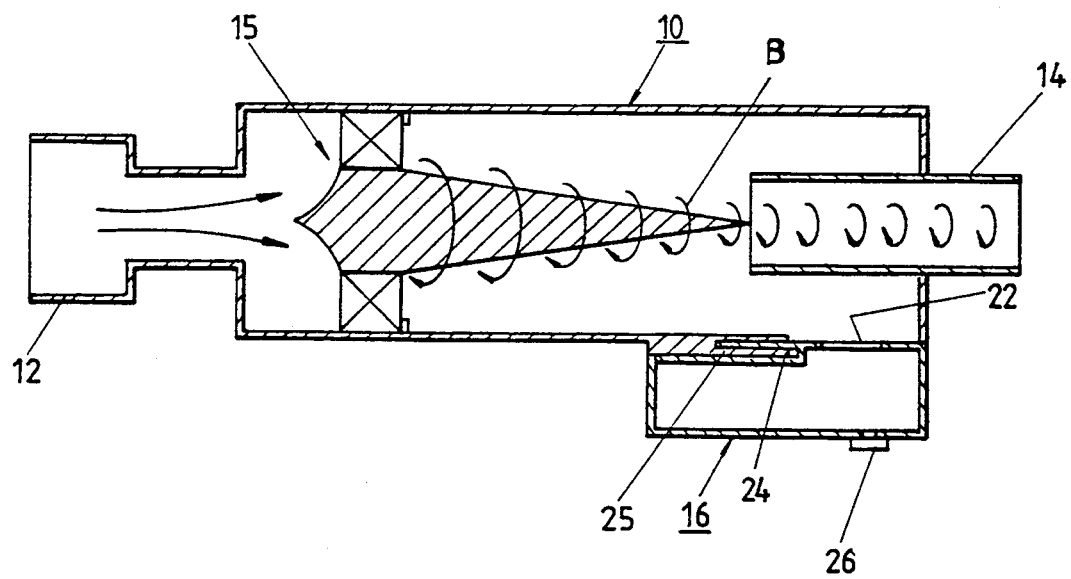
FIG. 3 is a sectional view of the dirt collecting apparatus of the invention.

Referring to FIGS. 3 and 4, there are shown a section of the dirt collecting apparatus and a cyclone part in the dirt collecting apparatus, respectively. As shown in the drawings, the dirt collecting apparatus "A" comprises a cylindrical dirt collecting chamber 10 having predetermined diameter and length and a cyclone part 15 received in the dirt collecting chamber 10. The dirt collecting chamber 10 is provided at its opposite ends with front and rear connectors 12 and 14. The front connector 12 may be connected to the rearmost wand segment 11 and the rear connector 14 may be connected to the handle pipe 13.

The cyclone part 15 comprises a cylindrical support 17 fitted in the inner surface of the dirt collecting chamber 10. An inner cylinder 18 on which a plurality of cycloid guiding vanes 19 are fixed and extended radially and outwardly therefrom is rotatably inserted in the cylindrical support 17. A conical core 20 is inserted in the inner cylinder 18.

The dirt collecting chamber 10 is formed with an opening 22 facing downward at a lower portion of an outer surface of a rear end thereof. The dirt collecting chamber 10 is also provided with a projecting fin 25 parallel to the outer surface of the chamber 10 at the front of the opening 22.

Referring to FIG. 5, there is shown a dirt container which is to be mounted on the dirt collecting chamber. As shown in the drawing, the dirt container 16 comprises a hexahedral box having an upper concave surface 21 corresponding to the outer surface of the dirt collecting chamber 10. The upper concave surface 21 of the dirt container 16 is partially cut into an "U" shape at a position corresponding to that of the opening 22 of the dirt collecting chamber 10, thereby creating a cut piece 23. The cut piece 23 is partially and inwardly bent so that an U-shaped gap 22a is formed between the upper surface 21 and the cut piece 23 in order to introduce dirt into the dirt container 16 in the direction of the arrow in FIG. 5. The dirt container 16 is also formed with a deep groove 24 parallel to and under the upper concave surface 21 so that the dirt container 16 is fitted to the lower surface of the dirt collecting chamber 10 by inserting the projecting fin 25 of the dirt collecting chamber 10 into the groove of the dirt container 16. Also, the dirt' container 16 is formed with hole at its lower surface and the hole is fitted with a cap 26 in order to discharge the dirt collected in the dirt container 16, as illustrated in FIG. 3.

In an assembling operation of the above-mentioned dirt collecting apparatus "A", the front connector 12 of the dirt collecting apparatus "A" is connected to the rearmost wand segment 11 and the rear connector 14 is connected to the handle pipe 13. The rearmost wand segment 11 is connected to the nozzle 27 through the remaining wand segments 11 and the handle pipe 13 is connected to the canister body (not shown) having a motor and a fan through the flexible hose 31 (see FIG. 2).

The operation of the vacuum cleaner employing the dirt collecting apparatus of the present invention will be described as follows.

First, upon actuating the motor received in the canister body (not shown), the fan fixed to the shaft of motor is rotated to cause a suction force to be generated at the nozzle 27. Then, dirt-laden air is introduced into the dirt collecting chamber 10 of the dirt collecting apparatus "A" through the nozzle 27 and the wand segments 11 while the inner cylinder 18 is rotated in the direction of the arrow "B" in FIG. 3 due to the suction force. Thereafter, the introduced dirt-laden air is guided by the cycloid guiding vanes 19 and thus converted from a linear flow into a cyclonic flow during passage through the cyclone part 15.

At this time, pure air in the dirt-laden air on which a lower centrifugal force is exerted is rotated and advanced along an outer surface of the core 20 and then introduced into the canister body through the rear connector 14, the handle pipe 13 and the hose 31 so as to be discharged outwardly from the canister body. On the other hand, after being passed through the cyclone part 15, dirt in the dirt-laden air which has a higher specific gravity relative to the pure air is dispersed outwardly during its cyclonical rotation and then spirally advanced along the inner surface of the dirt collecting chamber 10. Consequently, when the dirt reaches the opening 22 of the dirt collecting chamber 10, the dirt is guided by the cut piece 23 and thus introduced into the dirt container 16 through the U-shaped gap 22a.

Thereafter, when the cleaning is completed, the dirt container 16 is separated from the dirt collecting chamber 10 and the cap 26 is pulled out of the hole of the dirt container 16 in order to eliminate the collected dirt from the dirt container 16 when required. Therefore, when it is necessary to eliminate collected dirt, the user can easily eliminate the dirt from the vacuum cleaner only by separating the dirt container 16 from the dirt collecting chamber 10.

As described in detail above, the dirt filtering and collecting apparatus for vacuum cleaner according to the present invention is mounted between the wand and the handle pipe and has the additional dirt container that may be conveniently detached from the dirt collecting apparatus, the canister body can be considerably reduced in volume, thereby facilitate a handling of the vacuum cleaner, and dirt collected in the dirt container is easily eliminated from the dirt collecting apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dirt collecting apparatus for a vacuum cleaner, comprising;
    a dirt collecting chamber which is in communication with an introduction path for dirt-laden air between a wand connected to a nozzle and a handle pipe connected to a canister body;
    a cyclone part inserted in the dirt collecting chamber which comprises a cylindrical support fitted in the inner surface of the dirt collecting chamber, an inner cylinder, on which a plurality of cycloid guiding vanes are fixed and extend radially and outwardly therefrom, rotatably inserted in the cylindrical support, and a conical core inserted in the inner cylinder; and
    a dirt container detachably mounted on the outer surface of the dirt collecting chamber which is adapted to receive dirt separated and collected in the dirt collecting chamber.

2. A dirt collecting apparatus in accordance with claim 1, wherein said dirt collecting chamber is provided at its upstream end with a front connector to be connected to the wand and at its downstream end with a rear connector to be connected to the handle pipe, said dirt collecting chamber is formed at the outer surface with an opening for introducing dirt separated in the dirt collecting chamber into the dirt container, and said dirt collecting chamber is provided at its outer surface and at the front of the opening with a projection adapted to couple the dirt container to the dirt collecting chamber.

3. A dirt collecting apparatus in accordance with claim 2, wherein said dirt container comprise a detachable box having an upper concave surface, said upper concave surface of said dirt container being partially cut to form a dirt guiding piece at a position corresponding to that of the opening and said dirt guiding piece being partially and inwardly bent to form a gap between the upper concave surface and the dirt guiding piece, and said dirt container is provided at its front end and under its upper concave surface with a groove so that said projection of said dirt collecting chamber is fitted in said groove in order to couple the dirt container to the dirt collecting chamber.

* * * * *